United States Patent [19]

Wössner et al.

[11] 4,345,748

[45] Aug. 24, 1982

[54] FLUID DAMPED UNIT, PARTICULARLY FOR USE AS SHOCK ABSORBER OR TELESCOPIC STRUT

[75] Inventors: Felix Wössner, Schweinfurt; Günther Handke, Euerbach; Manfred Koller, Bergrheinfeld, all of Fed. Rep. of Germany

[73] Assignee: Fichtel & Sachs AG, Schweinfurt, Fed. Rep. of Germany

[21] Appl. No.: 98,515

[22] Filed: Nov. 29, 1979

[30] Foreign Application Priority Data

Dec. 14, 1978 [DE] Fed. Rep. of Germany ....... 2853914

[51] Int. Cl.³ .................... B60G 13/06; B60G 15/12
[52] U.S. Cl. ................................. 267/8 R; 267/64.15
[58] Field of Search ........... 267/8 R, 34, 65 R, 64 R, 267/150, 151, 136, 64.15, 64.25; 280/120, 724, 708, 709, 702; 188/284, 285

[56] References Cited

U.S. PATENT DOCUMENTS

| | | | |
|---|---|---|---|
| 1,605,798 | 11/1926 | Van Crombrugge | 267/8 R |
| 3,603,574 | 9/1971 | Lutz | 267/8 R |
| 3,910,565 | 10/1975 | Persicke | 267/65 R |

FOREIGN PATENT DOCUMENTS

| | | |
|---|---|---|
| 681818 | 3/1964 | Canada .............................. 188/8 R |
| 683198 | 11/1952 | United Kingdom . |
| 812528 | 4/1959 | United Kingdom . |
| 887191 | 1/1962 | United Kingdom . |
| 2008716 | 6/1979 | United Kingdom . |
| 2014694 | 8/1979 | United Kingdom . |

Primary Examiner—James B. Marbert
Attorney, Agent, or Firm—Toren, McGeady & Stanger

[57] ABSTRACT

A fluid damped unit includes a cylinder, a piston rod arranged for extending and retracting movement from one end of the cylinder, the rod having a piston at its end within the cylinder, and a damper unit arranged in an annular work chamber formed between the piston rod and the cylinder for damping the movement of the piston rod. The damper unit includes a damping ring which is carried in a damping ring carrier, the ring frictionally contacting the inner circumferential surface of the cylinder. A stop ring is mounted to the piston rod for contacting the damping ring carrier when the piston rod is extended past a predetermind intermediate position toward a fully extended position wherein movement of the piston rod is hydraulically damped. The damping ring carrier is arranged to be fixed in the axial direction of the cylinder when the piston rod is retracted beyond its predetermined intermediate position. Thus, hydraulic damping of the piston rod movement occurs with certainty each time the rod is extended past its predetermined intermediate position relative to the cylinder.

32 Claims, 9 Drawing Figures

FLUID DAMPED UNIT, PARTICULARLY FOR USE AS SHOCK ABSORBER OR TELESCOPIC STRUT

BACKGROUND OF THE INVENTION

The present invention relates to a fluid damped unit which is particularly suitable for use as a shock absorber or telescopic strut, the unit including a cylinder, a piston rod inserted into the cylinder from one end of the cylinder through a guiding and sealing unit, a piston which is fastened to the piston rod inside the cylinder and which divides the interior of the cylinder into two work chambers, namely an annular work chamber bordering the guiding and sealing unit and a work chamber at that end of the cylinder which is located opposite the guiding and sealing unit.

The cylinder is charged with fluid, and the piston rod can be reciprocated between a fully retracted position at which the rod is telescoped within the cylinder to the extent possible and a fully extended position at which the rod is extended as much as possible out of the cylinder. A damper unit is located in the annular work chamber, this unit including a compression spring which surrounds the piston rod with one end facing toward the guiding and sealing unit and bearing against the guiding and sealing unit or against the cylinder.

A damping ring unit is arranged at the other end of the compression spring and divides the annular work chamber into two annular chamber sections. The damping ring unit includes a damping ring carrier, a damping ring arranged in the damping ring carrier to bear against the inner circumferential surface of the cylinder, and a stop which is movable together with the piston rod and which, starting at a predetermined intermediate position of the rod, abuts the damping ring carrier during movement of the piston rod from the fully retracted position in the direction toward the fully extended position, whereby the stop moves the damping ring carrier and the damping ring in the direction toward the guiding and sealing unit, so that hydraulic damping occurs, and the compression spring is compressed.

In accordance with pending U.S. patent application Ser. No. 008,513, filed Feb. 1, 1979, and assigned to the assignee of the present application, the damping ring unit is fixed in axial direction of the piston rod when the rod is retracted beyond the predetermined position, the damping ring bearing frictionally against the inner circumferential surface of the cylinder, the damping ring carrier being movable relative to the damping ring with only a slight axial play.

An object of the present invention is to provide a fluid damped unit arranged so that when the piston rod is retracted beyond its predetermined intermediate position, the damping unit is axially fixed relative to the cylinder in a position corresponding to the predetermined intermediate position of the piston rod, independently from the friction of the damping ring at the inner circumferential surface of the cylinder.

In accordance with the present invention, the damping ring unit is fixed in the axial direction of the cylinder when the piston rod is retracted in the cylinder beyond its predetermined intermediate position in the direction toward the fully retracted position, (a) by fastening the damping ring carrier to the end of the compression spring which faces toward the carrier, and fastening the end of the compression spring facing toward the guiding and sealing unit to the guiding and sealing unit or the corresponding end of the cylinder; or (b) by providing a stop on the cylinder and arranging the damping ring unit to bear against the stop.

The present invention ensures that, as the piston rod is extended out of the cylinder, damping of the rod movement begins with certainty exactly at the predetermined intermediate position of the piston rod.

As already provided in pending application Ser. No. 008,513, the damping ring unit may be bridged by means of a fluid passage which includes a valve mechanism responsive to the direction of movement of the piston rod in such a manner that the cross section of the fluid passage is smaller when the piston rod is extended in the direction toward its fully extended position than during retraction of the piston rod in the direction toward its fully retracted position. To form the valve mechanism, the damping ring may be axially movable relative to the damping ring carrier between two end positions, namely a first end position near the guiding and sealing unit and a second end position remote from the guiding and sealing unit. The damping ring assumes its first end position in which the cross section of the passage is larger when the piston rod is retracted in the direction toward its fully retracted position, and assumes its second end position in which the cross section of the passage is smaller when the piston rod is extended.

The valve mechanism essentially avoids damping of retracting movement of the rod by means of the damping ring unit when the piston rod is retracted, but effects significant additional damping of the piston rod movement, which damping can be made to vary along the travel path of the rod, beginning at the predetermined intermediate position of the rod in the direction toward its fully extended position.

Further, a damping ring of plastics material can be produced inexpensively, and the danger of scoring the inner circumferential surface of the cylinder is avoided when such a damping ring is used.

The damping ring carrier may consist of a metallic or a plastics material, and the sensitive damping ring is kept free of mechanical loading by protecting it by way of the damping ring carrier which absorbs such loading.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
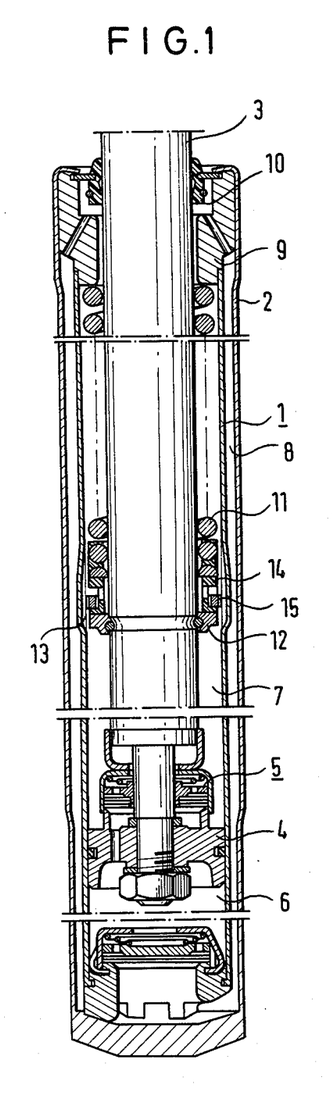
FIG. 1 is an elevational cross sectional view of a double tube vibration damper with a damper unit according to the present invention.

FIG. 1 shows a vibration damper which is constructed within a telescopic strut and includes a cylinder 1 which is arranged concentrically in a tubular container 2. A compensating chamber 8 is formed between the cylinder 1 and the container 2, chamber 8 being connected to a work chamber 6 within the lower portion of cylinder 1 through a bottom valve.

A piston rod 3 extends within the cylinder 1 and carries a piston 4 at its end within the cylinder 1. Piston 4 is provided with a damping unit 5. The piston rod 3 is guided by a piston rod guide 9 at the top of the cylinder, and is sealed from the outside by a piston rod seal 10 at the top of the container 2, as viewed in FIG. 1. The interior of the cylinder 1 is thus divided by the piston 4 into the work chamber 6 which is arranged at the bottom of cylinder 1 underneath the piston 4, and an annular work chamber 7 which is formed between the outer circumferential surface of the piston rod 3 and the inner wall of the cylinder 1.

Figure 2:
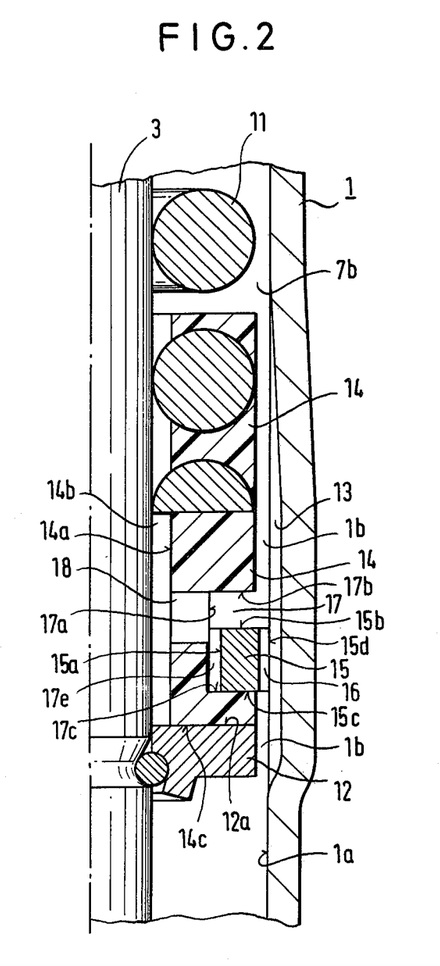
FIG. 2 is an enlarged cross sectional view of the damper unit illustrated in FIG. 1.

A hydraulic-mechanical damper unit which dampens the movement of the piston rod 3 within the cylinder 1 is illustrated in FIG. 1 and is shown in an enlarged scale in FIG. 2. The damper unit includes a compression spring 11 which is clamped at one end to the inner wall of the cylinder 1 in the region of the piston guide 9. The damper unit also includes a damping ring carrier 14 of plastics material which is formed onto the other end of the spring 11 by injection molding. A damping ring 15 is arranged in an annular groove 17 in the damping ring carrier 14. The extent of the groove 17 in the axial direction of the carrier 14 is larger than that of the ring 15. Groove 17 is defined by a bottom circumferential surface 17a, and lateral surfaces 17b and 17c. The damping ring 15 has an inner circumferential surface 15a, end surfaces 15b and 15c, and an outer circumferential surface 15d. Surface 15d frictionally engages inner circumferential surface 1a of the cylinder 1.

Together with the inner circumferential surface 1a of the cylinder 1, the damping ring carrier 14 forms an annular gap 1b. The inner circumferential surface 15a of the damping ring and the bottom circumferential surface 17a of the groove bottom form an annular gap 17e. Also, the damping ring carrier 14 has an inner circumferential surface 14a, the surface 14a and the outer circumferential surface of the piston rod 3 forming an annular gap 14b. At least one groove 16 extending in the axial direction is provided in the outer circumferential surface 15d of the damping ring 15. The damping ring carrier 14 is provided with a through opening 18 which communicates between the annular groove 17 and the annular gap 14b. A stop ring 12 having a stop surface 12a facing toward the carrier 14 is fixed to the piston rod 3.

After the piston rod 3 is extended a certain distance from the cylinder 1, the damping ring carrier 14 makes contact at its bottom surface 14c with the stop surface 12a of the stop ring 12.

A longitudinal corrugation or channel 13 is arranged in the inner circumferential surface 1a of the cylinder, 1, the channel 13 being formed in such a way that, as the damping ring 15 is moved in the direction toward the piston rod guide 9, a throttling cross sectional area of the open passage between the damping ring 15 and the inner surface 1a continually decreases to zero. Thus, the throttling cross sectional area varies in accordance with the travel of the piston rod 3. The damping ring carrier 14 and the stop ring 12 divide the annular work chamber 7 into annular chamber sections 7a and 7b.

Operation of the hydraulic-mechanical damper unit illustrated in FIGS. 1 and 2 will now be explained.

When the piston rod 3 is extended out from the cylinder 1, the stop ring 12 fastened on the piston rod 3 makes contact with the bottom surface 14c of the damping ring carrier 14 after the rod travels a certain distance. The damping ring 15 makes contact with the lower surface 17c of the annular groove 17, and a fluid damping passage is formed by the groove 16 of the damping ring 15 together with the longitudinal channel 13. Because of the fact the cross sectional area of the passage formed by the longitudinal channel 13 in the cylinder 1 becomes continuously smaller during extending movement of the piston rod 3, hydraulic damping is started gradually. At the end of the longitudinal channel 13 closest to the piston rod guide 9, hydraulic damping is determined only by the cross sectional area of groove 16 in the damping ring 15. When the damping ring 15 reaches this position, fluid flowing from the annular chamber section 7b to the annular chamber section 7a through the annular gap 14b, the through opening 18, the annular gap 17e and the annular gap 1b is blocked by the damping ring 15. Accordingly, further extending of the piston rod 3 must overcome the resistance of this hydraulic damping action together with the force needed to compress the spring 11. The hydraulic damping action can be initiated smoothly by appropriate design of the longitudinal channel 13 in the cylinder 1 which determines the varying damping cross section according to the distance travelled by the piston rod 3.

As the piston rod 3 is retracted in the cylinder 1, the damping ring 15 makes contact with the lateral surface 17b of the annular groove 17, and damping fluid can flow from the annular chamber section 7a into the annular chamber section 7b through a passage having a relatively large cross section which is defined by the annular gap 1b, the resulting axial play between the lateral groove surface 17c and the damping ring end surface 15c, the annular gap 17e, the through opening 18 and the annular gap 14b. In this manner, the damper unit provides hydraulic damping to a degree which depends upon the direction of movement of the piston rod 3. This damping, which is dependent upon the direction of movement, results from the mobility or axial free play of the damping ring 15 in the annular groove 17 of the damping ring carrier 14. After retracting movement of the piston rod 3 over a certain distance, the stop ring 12 moves off of the damping ring carrier 14, and the hydraulic-mechanical damper unit is rendered ineffective. Because of the fact that the spring 11 is fastened in the region of the piston rod guide 9 in the cylinder 1, the damping ring unit including the damping ring carrier 14 and the damping ring 15 remains stationary within the cylinder 1.

Figure 3:
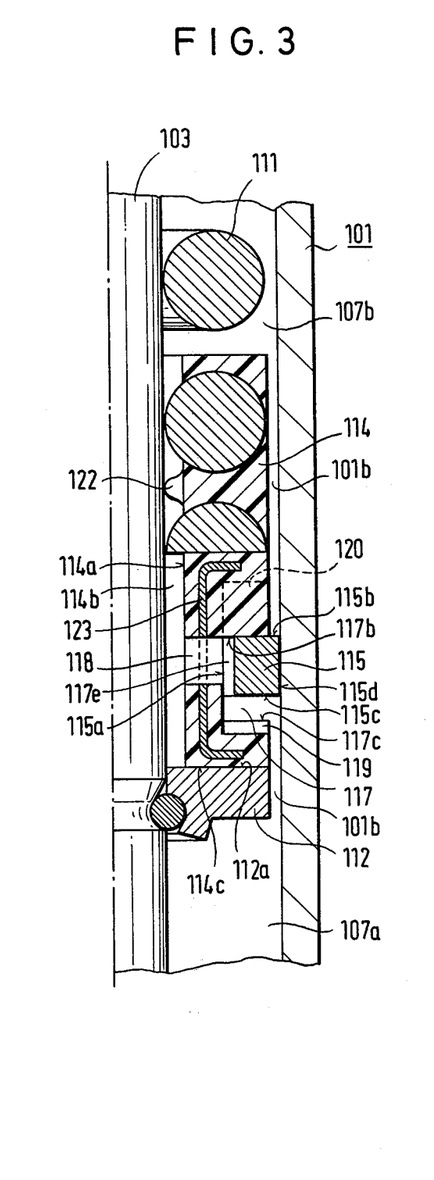
FIG. 3 is a cross sectional view of a second embodiment of the damper unit of FIG. 2.

The embodiment shown in FIG. 3 is partially similar to the embodiment of FIG. 2. Corresponding parts are provided with the same reference numeral, each increased by the number 100. This embodiment differs from the one of FIG. 2 in that the damping ring carrier 114 is reinforced with a steel ring 123 having a U-shaped cross section which is embedded within damping ring carrier 114. The damping ring carrier 114 is further provided with an indentation 119 in the lateral groove surface 117c which cooperates with the damping ring 115 to form a passage for damping fluid during extending movement of the piston rod.

The damping ring carrier 114 is further provided with recesses 120. When the damper unit begins to operate, the damping ring 115 makes contact with the lateral surfaces 117c of the annular groove 117, and only the passage formed by the indentation 119 is open for the damping fluid. Of course, additional axial grooves can be provided on the outer circumferential surface 115d of the damping ring 115. The liquid displaced in the annular chamber section 107b reaches the annular chamber section 107a through the annular gap 101b, the recess 120, the annular gap 117e, the indentation 119, and, once again, the annular gap 101b.

When the piston rod 103 is moved in the opposite direction, i.e., when it is retracted in the cylinder 101, the damping ring 115 makes contact with the lateral surface 117b of the annular groove 117, as shown in FIG. 3, and the damping fluid flows from the annular chamber section 107a through the relatively large gap provided between the lateral groove surface 117c and the damping ring end surface 115c, the annular gap 117e, the recesses 120, the annular gap 101b, the through opening 118 and the annular gap 114b into the upper annular chamber section 107b. Guide cams 122 extending from the inner circumferential surface of the damping ring carrier 114 engage the piston rod 103 for guiding the damping carrier 114 on the piston rod 103. Two circumferential rows of guide cams 122 are preferably provided which are spaced axially of each other, each row consisting of, for example, four guide cams 122.

Figure 4:
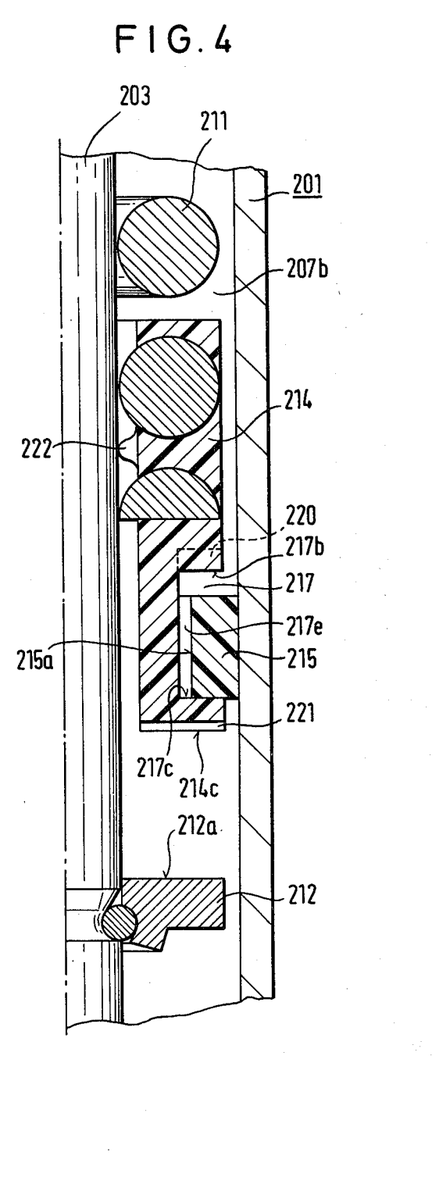
FIG. 4 is a cross sectional view of a third embodiment of the damper unit of FIG. 2.

The embodiment shown in FIG. 4 is similar to the embodiment of FIG. 3, the bottom surface 214c of the damping ring carrier 214 being provided with at least one radially extending recess 221. In the position shown, the stop ring 212 connected to the piston rod 203 is not in contact with the damping ring carrier 214. The damping ring 215 is formed of a plastics material and, in the region of its inner circumferential surface 215a, is provided with a plurality of axially extending grooves 217e. When the damping ring 215 contacts the lateral groove surface 217b, the grooves 217e allow damping fluid to flow through the recesses 220 into the annular chamber section 207b. A plurality of circumferentially distributed guide cams 222 are provided for guiding the damping ring carrier 214 on the piston rod 203.

As soon as the stop surface 212a of the stop ring 212 strikes against the bottom surface 214c of the damping ring carrier 214, once the piston rod 203 is extended beyond a predetermined position, the recess 221 forms a radially extending passage and, as the piston rod 203 is further extended, the damping ring 215 makes contact with the lower lateral surface 217c of the annular groove 217 so that only the cross sectional area of the recess 221 provides a passage for hydraulic damping fluid. The cross sectional area of the recess 221 is therefore chosen in accordance with the desired damping effect. When the piston rod 203 is retracted in the cylinder 201, the damping ring 215 makes contact with the upper lateral surface 217b of the annular groove 217. As a result, in addition to the permanently open passage through the recess 221, another passage is provided through which the damping fluid can flow into the annular chamber section 207b through the annular groove 217. This passage is formed by the annular groove 217 and the damping ring 215, and the recesses 220.

Figure 5:
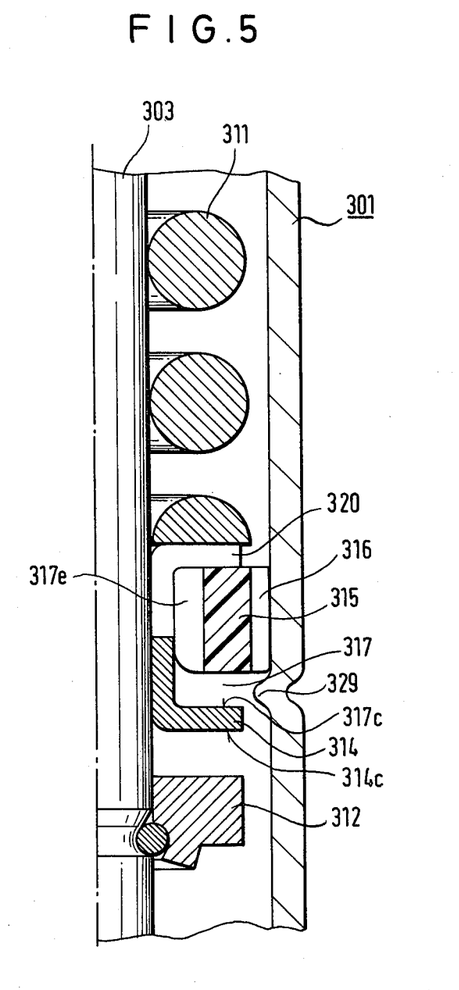
FIG. 5 is a cross sectional view of a fourth embodiment of the damper unit of FIG. 2.

Another embodiment is illustrated in FIG. 5. In this case, the spring 311 is held at its top end in the cylinder 301 in the region of the piston rod guide (unshown) and, at its lower end, bears against the damping ring carrier 314. A stopper 329 is formed by a plurality of radially inwardly directed projections in the cylinder 301 for limiting the axial movement of the damper unit. As the piston rod 303 is retracted, the damping ring 315 makes contact with the stopper 329 and, as the piston rod 303 is further retracted, the stop ring 312 moves off the bottom stop surface 314c of the damping ring carrier 314. This position is shown in FIG. 5.

Hydraulic damping action which is dependent upon the direction of movement of the piston rod 303 is achieved in that the damping ring carrier 314 is provided with a through opening 320 which, when the piston rod 303 is retracted into the cylinder, forms an additional passage together with the inner groove 317e of the damping ring 315. During extending movement of the piston rod 303 out of the cylinder 301, the damping ring 315 makes contact with the lateral surface 317c of the groove 317, and only the outer groove 316 in the damping ring 315 is open as a passage for the damping fluid.

Figure 6:
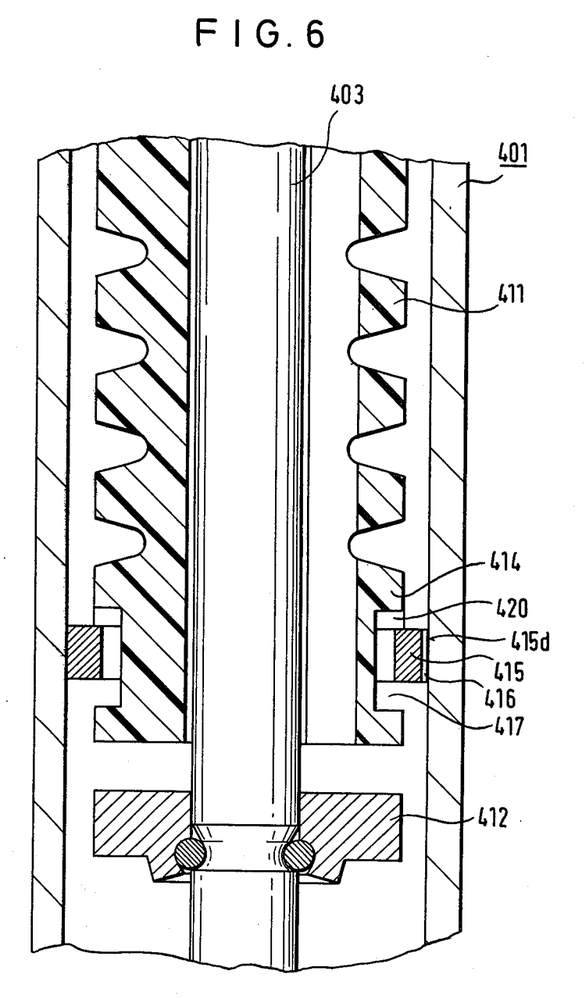
FIG. 6 is a cross sectional view of a fifth embodiment of the damper unit of FIG. 2.

In the embodiment of FIG. 6, the spring 411 is formed of a plastics material, and is constructed in one piece integrally with the damping ring carrier 414. As in the embodiment of FIG. 4, a recess 420 is arranged in the annular groove 417, and a continuously open passage is formed, for example, by an axial groove 416 on the outer circumference of the damping ring 415. The plastics material spring 411 is also clamped at its upper end in the region of the piston rod guide in the cylinder (unshown) by being provided with an increased diameter portion in this region.

Figure 7:
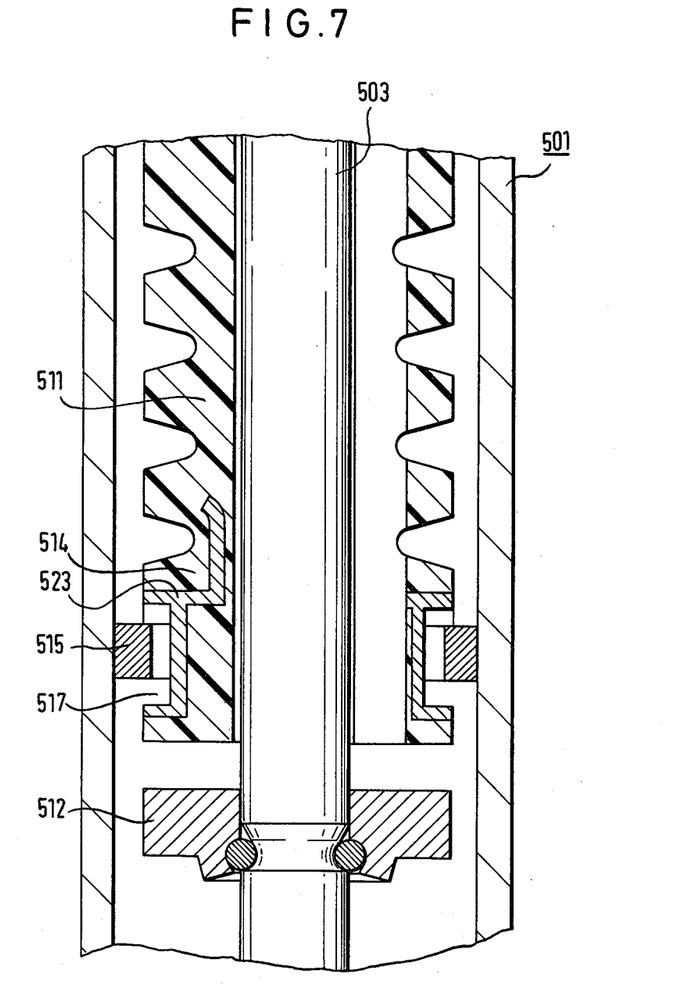
FIG. 7 is a cross sectional view of a sixth embodiment of the damper unit of FIG. 2.

FIG. 7 illustrates a spring 511 of plastics material with a metal reinforcement 523 embedded in the spring to form the groove 517 of the damping ring carrier 514.

Figure 8:
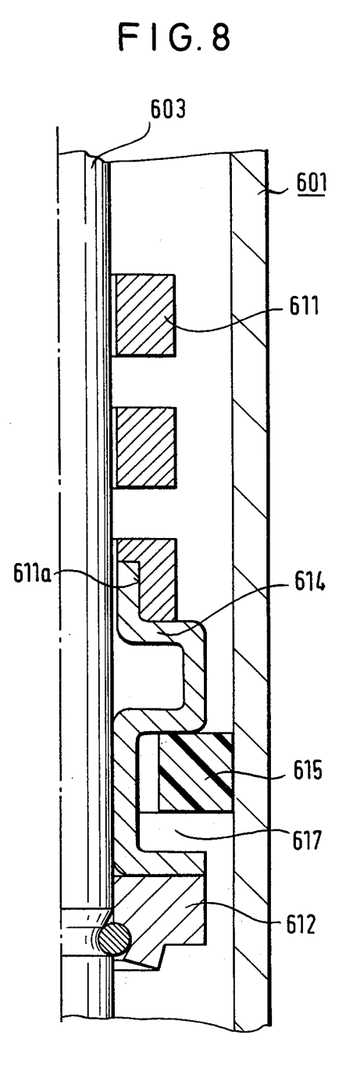
FIG. 8 is a cross sectional view of a seventh embodiment of the damper unit of FIG. 2.

In the embodiment of FIG. 8, the spring 611 has coils of rectangular cross section, and has a groove 611a cut in its bottom which serves to receive the upper end of the damping ring carrier 614.

Figure 9:
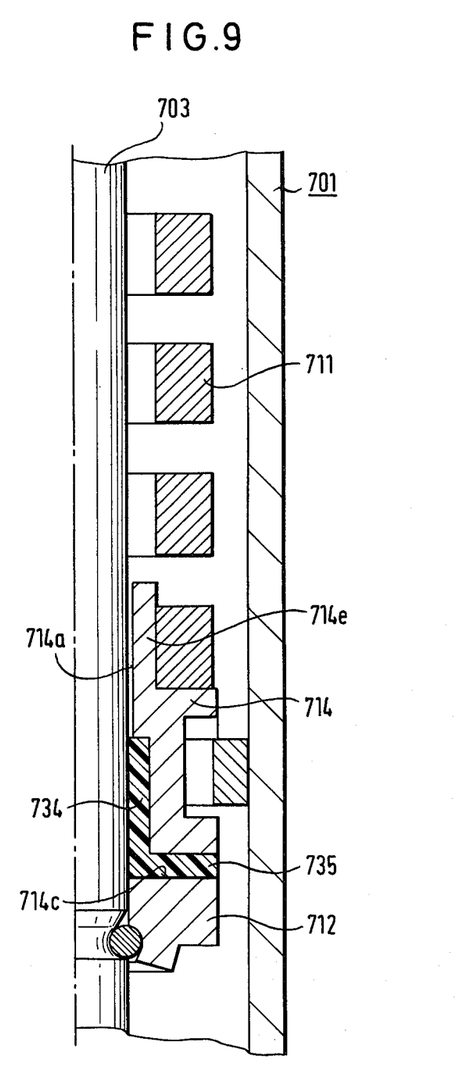
FIG. 9 is a cross sectional view of an eighth embodiment of the damper unit of FIG. 2.

In the embodiment of FIG. 9, the spring 711 having coils of rectangular cross section is connected at its lower end to the damping ring carrier 714 by a sleeve-shaped projection 714e extending axially from the inner edge of the damping ring carrier 714. A bushing 734 of a smooth sliding material, for example, Teflon or similar plastics material is provided in the region of the inner diameter of the damping ring carrier 714. The bushing 734 may be constructed, for example, in one piece with a disc-shaped portion 735 which forms a bottom surface 714c for abutting the stop ring 712. Such a design is especially suitable for damping ring carriers 714 made of metal in order to avoid generation of noise when the damping ring carrier 714 strikes against the stop ring 712.

While specific embodiments of the invention have been shown and described in detail to illustrate the application of the inventive principles, it will be understood that the invention may be embodied otherwise without departing from such principles.

What is claimed is:

1. A fluid damped unit particularly suitable as a shock absorber comprising a cylinder, a piston rod positioned within said cylinder and arranged for extending and retracting movement from one end of said cylinder, means located at said one end of said cylinder for guiding said piston rod and sealing said cylinder, a piston fixed to said piston rod near the end of said piston rod within said cylinder, said piston dividing the interior of said cylinder into a first annular work chamber adjacent said guiding and sealing means and a second work chamber adjacent the end of said cylinder which is opposite said guiding and sealing means, a fluid charge in said cylinder, wherein said piston rod can be reciprocated between a fully retracted position and a fully extended position relative to said cylinder, and damper means arranged in said first annular work chamber for damping the movement of said piston rod, said damper means arranged to create a damping force applied against said piston rod during a portion of its movement intermediate said fully retracted and fully extended positions and including throttling fluid passage means located within said first work chambers and dividing said first work chamber into two annular chamber sections, said damper means also comprising a compression spring which surrounds said piston rod, said compression spring having one end facing toward said guiding and sealing means which bears against one of said guiding and sealing means and said cylinder, damping ring means including a damping ring carrier arranged at the other end of said compression spring to divide said first annular work chamber into said two annular chamber sections, a damping ring arranged in said damping ring carrier to frictionally contact the inner circumferential surface of said cylinder and being axially movable relative to said damping ring carrier between a pair of end positions, one of said end positions being closer to said piston and the other end position being more remote from said piston, said damping ring reducing the flow cross section of said throttling fluid passage means when located in the one of said end positions and increasing the flow cross section of said throttling fluid passage means when located in the other said end position, and said damping ring carrier is fixed to said compression spring, and stop means mounted for movement together with said piston rod.

2. A fluid damped unit according to claim 1, wherein said stop means being arranged for contacting said ring carrier when said piston rod is extended from its fully retracted position in the direction toward its fully extended position after said piston rod reaches a predetermined intermediate position, and for moving said damping ring carrier and said damping ring in the direction toward said guiding and sealing means wherein the movement of said piston rod is hydraulically damped and said compression spring is compressed, and check means for maintaining said damping ring unit fixed in the axial direction relative to said cylinder when said piston rod is retracted beyond said predetermined intermediate position in the direction toward said fully retradted position within said cylinder.

3. A fluid damped unit according to claim 2, wherein said check means includes means for fastening said damping ring carrier to said other end of said compression spring and means for fastening said one end of said compression spring to one of said guiding and sealing means and said cylinder.

4. A fluid damped unit according to claim 2, wherein said check means comprises a stopper on the inner circumferential surface of said cylinder for engaging said damping ring.

5. A fluid damped unit according to claims 1, 3 or 4, wherein said damping ring means comprises valve means for forming a damping fluid passage communicating between said two annular chamber sections, said valve means being responsive to the direction of movement of said piston rod so that the cross-sectional area of said fluid passage is smaller when said piston rod is extended in the direction toward its fully extended position than when said piston rod is retracted in the direction toward its fully retracted position.

6. A fluid damped unit according to claim 5, wherein said valve means including said damping ring wherein said damping ring assumes its first end position to form said fluid passage of relatively large cross-sectional area when said piston rod is retracted toward its fully retracted position, and said damping ring assumes its second end position to form said fluid passage of relatively smaller cross section when said piston rod is extended toward its fully extended position.

7. A fluid damped unit according to claim 6, wherein said damping ring carrier has an annular groove therein which is open toward the inner circumferential surface of said cylinder, said annular groove being defined by a bottom circumferential surface of said groove and two axially spaced lateral surfaces, said damping ring having an inner circumferential surface which is located opposite said bottom circumferential surface of said groove and two axially spaced end surfaces each located opposite said lateral surfaces of said annular groove, said annular groove receiving said damping ring and extending over a greater axial distance than the axial extent of said damping rings.

8. A fluid damped unit according to claim 7, wherein said inner circumferential surface of said cylinder and said damping ring carrier form a first gap, and said bottom circumferential surface of said annular groove and said inner circumferential surface of said damping ring form a second gap.

9. A fluid damped unit according to claim 8, wherein one of said lateral surface of said annular groove which faces toward said guiding and sealing means and said end surface of said damping ring which faces away from said guiding and sealing means has at least one radially extending indentation for determining the smaller fluid passage cross-sectional area when said damping ring is in its second end position.

10. A fluid damped unit according to claim 7, wherein said damping ring carrier has an opening in fluid communication between said annular groove and the annular chamber section adjacent said guiding and sealing means.

11. A fluid damped unit according to claims 1, 3 or 6, wherein said piston rod and said damping ring carrier form a gap, said stop means operating to close said gap when said piston rod is extended from said cylinder beyond said predetermined intermediate position.

12. A fluid damped unit according to claims 1, 3 or 4, wherein said stop means comprises a stop ring having a stop surface facing toward said guiding and sealing means, and said damping ring carrier has a stop surface facing toward the stop surface of said stop ring for cooperating therewith.

13. A fluid damped unit according to claim 12, wherein one of said stop surface of said stop ring and said surface of said damping ring carrier facing said stop ring has at least one radially extending indentation for forming said fluid passage of smaller cross sectional area.

14. A fluid damped unit according to claims 1, 3 or 4, wherein said damping ring carrier is formed of a plastics material.

15. A fluid damped unit according to claim 14, including a metal part inserted in said plastics material.

16. A fluid damped unit according to claim 15, wherein said metal part is embedded in said plastics material for reinforcing said damping ring carrier.

17. A fluid damped unit according to claim 15, wherein said metal part forms at least a portion of said annular groove.

18. A fluid damped unit according to claim 15, wherein said metal part has a U-shaped cross section.

19. A fluid damped unit according to claim 14, wherein said plastics material damping ring carrier is formed onto said compression spring by means of injection molding.

20. A fluid damped unit according to claims 1, 3 or 4, wherein said compression spring is formed of a material selected from the group of rubber and plastics.

21. A fluid damped unit according to claim 20, wherein said damping ring carrier is integrally formed with said spring.

22. A fluid damped unit according to claims 1, 3 or 4, wherein said compression spring and said damping ring carrier each have surfaces which interengage each other to hold said damping ring carrier on said compression spring.

23. A fluid damped unit according to claim 22, wherein said interengaging surfaces are in frictional engagement with each other.

24. A fluid damped unit according to claim 4, wherein said stopper comprises a radially inwardly directed indentation on said cylinder.

25. A fluid damped unit according to claim 4, wherein said stopper comprises an annular constriction on said cylinder.

26. A fluid damped unit according to claims 4, 24 or 25, wherein said stopper operatively abuts said damping ring.

27. A fluid damped unit according to claims 1, 3 or 4, wherein said damping ring has at least one axially extending indentation on its outer circumferential surface which forms said fluid passage of smaller cross sectional area.

28. A fluid damped unit according to claims 1, 3 or 4, wherein said cylinder has at least one axially extending channel on its inner circumferential surface.

29. A fluid damped unit according to claim 28, wherein the cross section of said channel decreases in the direction toward said guiding and sealing means.

30. A fluid damped unit according to claims 1, 3 or 4, wherein said damping ring carrier has a plurality of circumferentially spaced guide cams on its inner circumferential surface which face toward said piston rod.

31. A fluid damping unit according to claims 1, 3 or 4 including a slide bushing arranged on the inner circumferential surface of said damping ring carrier, said bushing facing towards said piston rod.

32. A fluid damping unit according to claims 1, 3, or 4, wherein said damping ring is formed of a plastics material including Teflon.

* * * * *